US011419312B2

(12) United States Patent
McEvilly

(10) Patent No.: US 11,419,312 B2
(45) Date of Patent: Aug. 23, 2022

(54) ANIMAL FLY MASK

(71) Applicant: X-Spand Equine LLC, Litchfield Park, AZ (US)

(72) Inventor: Molly Elizabeth McEvilly, Litchfield Park, AZ (US)

(73) Assignee: X-SPAND EQUINE, LLC, Litchfield Park, AZ (US)

(*) Notice: Subject to any disclaimer, the term of this patent is extended or adjusted under 35 U.S.C. 154(b) by 0 days.

(21) Appl. No.: 17/091,438

(22) Filed: Nov. 6, 2020

(65) Prior Publication Data
US 2021/0127636 A1 May 6, 2021

Related U.S. Application Data

(60) Provisional application No. 62/931,276, filed on Nov. 6, 2019.

(51) Int. Cl.
*A01K 13/00* (2006.01)
*B68C 5/00* (2006.01)

(52) U.S. Cl.
CPC .......... *A01K 13/006* (2013.01); *B68C 5/00* (2013.01)

(58) Field of Classification Search
CPC ...... A01K 13/007; A01K 13/006; A61D 9/00; B68C 5/00
USPC ...... 54/80.2, 80.5, 80.1, 80.4; 119/836, 654; D30/145
See application file for complete search history.

(56) References Cited

U.S. PATENT DOCUMENTS

| | | | | |
|---|---|---|---|---|
| 557,710 A * | 4/1896 | Smith | ............. | A01K 15/006 119/836 |
| 2,407,029 A * | 9/1946 | Miller | ............. | B68B 1/10 54/80.2 |
| 2,871,642 A * | 2/1959 | Damone | ............. | A01K 13/006 54/80.2 |
| 4,480,429 A * | 11/1984 | Knox | ............. | A01K 13/006 2/440 |
| 4,581,877 A * | 4/1986 | Wilber | ............. | A61D 9/00 128/858 |
| 4,662,156 A * | 5/1987 | Oettel | ............. | A01K 13/006 54/80.2 |
| 5,341,627 A * | 8/1994 | Eby | ............. | A01K 13/007 54/80.2 |
| 5,345,751 A * | 9/1994 | Edwards | ............. | A01K 13/006 54/80.2 |
| 5,440,864 A * | 8/1995 | Green | ............. | A01K 13/006 54/80.2 |
| 6,128,891 A * | 10/2000 | McMahon | ............. | A01K 13/006 119/850 |

(Continued)

OTHER PUBLICATIONS

Amazon 4-Way Stretch Nylon Spandex (https://www.amazon.com/Suitable-Sportswear-Activewear-Swimwear-Dancewear/dp/B01N8YPAZ7?th=1) (Year: 2016).*

*Primary Examiner* — Brady W Frazier
*Assistant Examiner* — Zoe Tam Tran
(74) *Attorney, Agent, or Firm* — Taft Stettinius & Hollister LLP; Derek B. Lavender

(57) ABSTRACT

A fly mask for an animal hat has a first section formed of a first material and a second section formed of a second material that is at least partially elastic. The first and second section are coupled to one another to fit at least partially around the head of an animal and the elastic material deforms to allow the mask to accommodate many different configurations.

17 Claims, 1 Drawing Sheet

(56) References Cited

U.S. PATENT DOCUMENTS

| | | | | |
|---|---|---|---|---|
| 6,216,642 B1* | 4/2001 | Hung | ............ | A01K 13/006 |
| | | | | 119/850 |
| 7,204,071 B1* | 4/2007 | Walker | ............ | B68C 5/00 |
| | | | | 54/80.2 |
| 9,277,732 B1* | 3/2016 | Chrostowski | ............ | B68B 7/00 |
| 2002/0108586 A1* | 8/2002 | Martin | ............ | A01K 13/006 |
| | | | | 119/850 |
| 2004/0244342 A1* | 12/2004 | Grogoza | ............ | A01K 13/006 |
| | | | | 54/79.4 |
| 2007/0169444 A1* | 7/2007 | Hung | ............ | A01K 13/006 |
| | | | | 54/80.4 |
| 2008/0092497 A1* | 4/2008 | Chang | ............ | A01K 13/006 |
| | | | | 54/80.2 |
| 2009/0241856 A1* | 10/2009 | Pressler | ............ | B68B 1/02 |
| | | | | 119/850 |
| 2015/0113923 A1* | 4/2015 | Wood | ............ | A01K 13/006 |
| | | | | 54/80.2 |

* cited by examiner

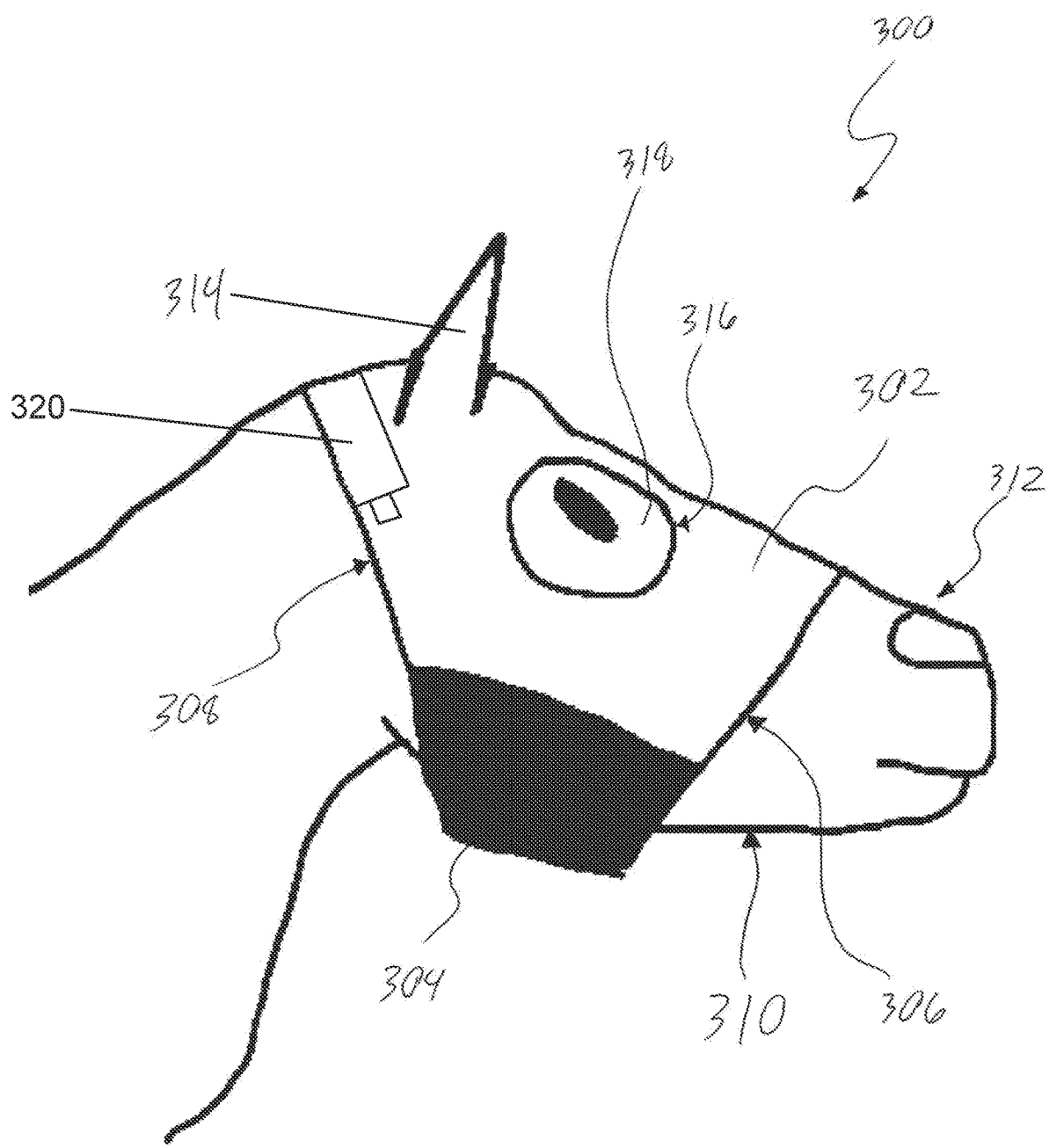

ANIMAL FLY MASK

CROSS-REFERENCE TO RELATED APPLICATION

The present disclosure claims the benefit of U.S. Provisional Application No. 62/931,276 filed Nov. 6, 2019, the contents of which are incorporated herein in entirety.

FIELD OF THE DISCLOSURE

The present disclosure relates to a fly mask for an animal, and more specifically to a fly mask that is expandable to accommodate movement of the animal.

BACKGROUND OF THE DISCLOSURE

Masks for animals are frequently used to protect the animal from the surrounding environment. One example is a fly mask for a horse or other similar animal. The fly mask may be positioned over portions of the animal's face to protect the animal from flies or other annoyances and dangers in the surrounding environment. Typical fly masks are formed of a single material positioned around the animal's head. While this may protect the animal from annoyances and the like from the surrounding environment, it often restricts the animals use of their head and jaw for things like eating and drinking.

SUMMARY

One embodiment is a fly mask for an animal. The fly mask has a first section formed of a first material and a second section formed of a second material that is at least partially elastic. In this embodiment, the first and second section are coupled to one another to fit at least partially around the head of an animal and the elastic material deforms to allow the mask to accommodate many different configurations.

In one example of this embodiment, the first section is coupled to the second section to form a front orifice and a rear orifice and the front orifice is sized to fit at least partially around the snout of the animal and the rear orifice is sized to fit around the head of the animal. In one aspect of this example the second section is coupled to the first section to be positioned at least partially along the jaw of the animal to allow the jaw to selectively stretch the second material when the jaw moves.

Another example of this embodiment includes ear cavities defined in the first section wherein the ear cavities are sized to correspond with the ears of the animal. Another example includes eye orifices defined in the first section and positioned to correspond with eyes of the animal. One aspect of this example includes a third section formed of a third material that is at least partially transparent. In part of this aspect, the first material, second material, and third material, are all different types of material.

In yet another example, the first material and the second material are different types of material. In another example the first material does not substantially elastically deform.

In another example of this embodiment, the first material is a mesh material and is configured to cover the eyes of the animal and allow the animal to see there through. In one aspect of this example, the first material defines ear orifices that are configured to allow ears of the animal to pass there through when the fly mask is positioned on the animal.

Yet another example includes a securing strap positioned on the first material proximate to the rear orifice and configured to selectively resize the rear orifice.

Another embodiment of this disclosure is a method of manufacturing a fly mask. The Method includes providing a first material and a second material that is different from the first material and that is at least partially elastic and coupling the first material to the second material to form a fly, mask that is configured to fit at least partially around the head of an animal. In this embodiment, the second material is coupled to the first material at a location that allows the fly mask to elastically deform to accommodate many different size configurations.

One example of this embodiment includes forming the first material of a mesh material. Another example includes forming the second material at least partially of sport nylon spandex. Yet another embodiment includes forming the second material at least partially of about 80% nylon and about 20% spandex. Another example considers forming the second material at least partially of tricot four-way stretch material. One example includes coupling a securing strap to the first material configured to selectively fit the fly mask to a head of an animal. Yet another example includes coupling the first material to the second material so the second material is substantially aligned with a jaw of an animal when positioned thereon.

Yet another embodiment is a fly mask for an animal that has a first section formed of a first material, a second section formed of a second material that is at least partially elastic and different from the first material, and a securing strap positioned on the first material proximate to a rear orifice and configured to selectively resize the rear orifice. In this embodiment, the first and second section are coupled to one another to fit at least partially around the head of an animal and the elastic material deforms to allow the mask to accommodate many different configurations. Further, the first section is coupled to the second section to form a front orifice and the rear orifice and the front orifice is sized to fit at least partially around the snout of the animal and the rear orifice is sized to fit around the head of the animal and the second section is coupled to the first section to be positioned at least partially along the jaw of the animal to allow the jaw to selectively stretch the second material when the jaw moves.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 1 is a side view of a fly mask for an animal.

Corresponding reference numerals are used to indicate corresponding parts throughout view.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Referring now to FIG. 1, one embodiment of this disclosure is illustrated. More specifically, FIG. 1 illustrates a fly mask 300 positioned on the head of an animal. The fly mask 300 may have a first section 302 that is coupled to a second section 304 to define a front orifice 306 and a rear orifice 308. The first section 302 may be formed of a first material. The first material may not substantially elastically deform but rather provide a barrier between the skin of the animal and the surrounding environment to prevent bugs and the like from irritating the animal. In one non-exclusive example, the first material may be a mesh material that allows the animal to see through the material as well as allowing air to circulate there through to cool the animal.

The second section 304 may be formed a second material that is different from the first material. More specifically, the second material may elastically deform under tension to allow the second material to stretch. In one non-exclusive example, the second material may be formed from an elastic material that is at least partially sport nylon spandex. More specifically, in one non-exclusive example the elastic material of the second section 304 may be about 80% nylon and about 20% spandex. Further, the second section 304 may be formed of a high quality tricot four-way stretch material that offers great stretching and recovery, good strength, and abrasion resistance as well as memory to retain its shape.

While specific examples of material for the second section 304 are discussed herein, this disclosure contemplates utilizing any material that has elastic properties. In another example, the second section 304 may be formed of an elastic material created by the Lycra® company. Accordingly, the examples discussed herein are not meant to be an exhaustive list of all materials considered. Rather, the second section 304 may be formed of any elastic material that promotes mobility of the animal and reduces abrasive contact thereto.

In one aspect of this disclosure, the first section 302 may be positioned along the head and snout 312 of the animal and the second section 304 may be positioned along the jaw 310 of the animal. In this configuration, the animal may move the jaw without substantial restrictions from the fly mask 300. More specifically, the second material of the second section 304 may stretch as the animal moves their jaw 310 to thereby ensure that the fly mask 300 remains properly positioned on the animal while allowing the animal to move their jaw 310.

The first section 302 may also have an ear pocket 314 formed therein for each ear of the animal. The ear pocket 314 may be a pocket in the first section 302 that is sized to receive the corresponding ear of the animal. The ear pocket 314 may be formed so a portion of the first material separates the ear of the animal from the surrounding environment to thereby prevent bugs and the like from entering the animal's ear. In other words, when the fly mask 300 is properly fitted on the head of the animal, the ear of the animal may be positioned in the ear pocket 314 and be substantially surrounded by the first material. While ear pockets 314 are discussed herein, in other embodiments the first section 302 may define an orifice around each ear of the animal to allow the ears to be positioned there through uncovered by the first section.

In another aspect of this disclosure, the first section 302 may have an eye orifice 316 defined therein for each eye of the animal. The eye orifice 316 may be a through hole in the first section 302 that is spaced to be positioned around the corresponding eye of the animal when the fly mask 300 is positioned thereon. In yet another aspect of this disclosure, the eye orifice 316 may have a third section 318 formed from a third material that substantially covers the eye orifice 316.

The third section 318 may be formed of a transparent or semi-transparent material that prevents bugs and the liked from irritating the eyes of the animal but allows the animal to at least partially see there through. Alternatively, the third section 318 may be formed of a mesh material that similarly allows the animal to see there through while protecting the eye from bugs and the like. Accordingly, this disclosure contemplates embodiments where the eye orifice 316 is an uncovered opening and embodiments wherein the eye orifice is covered by a material that the animal can at least partially see through.

In another embodiment of this disclosure, there may be no eye orifice 316 at all. Rather, the entire first section 302 may be formed of a mesh or clear material that the animal can see through. In this configuration, the eye orifice 316 and third section 318 is not necessary because the animal can see through the material of the first section 302.

The fly mask 300 may also have a securing strap 320 positioned by the rear orifice 308. The securing strap 320 may be removably coupleable about the rear orifice 308 to alter the size of the second orifice 308 to allow the fly mask 300 to fit around differently sized heads. The securing strap 320 may be positioned on the first section 302 and located behind the ear pockets 314 or ear orifices and the second orifice 308. The securing strap 320 may utilize Velcro, snaps, or any other known securing system that allows the securing strap 320 to be configured in multiple different lengths to alter the size of the second orifice 308. In one example, the securing strap 320 may be formed of an elastic material similar to the second section 304.

In one non-exclusive example, the fly mask 300 is sized to fit over the head of a horse. In this example, the first section 302 is positioned over the head and snout 312 of the horse while the second section 304 is positioned along the jaw 310. The ears of the horse may positioned inside the ear pocket 314 of the first section 302 and the eyes of the horse may be positioned along the eye orifice 316. In this configuration, the fly mask 300 may effectively prevent bugs and the like from agitating the horse while allowing the horse to easily eat, drink, and otherwise move the jaw 310 since the second section 304 allows corresponding elastic deformation. In the embodiment with the securing strap 320, after the fly mask 300 is positioned over the head of the horse the securing strap 320 may be coupled in a tightened configuration to prevent the fly mask from falling off the head of the horse.

While the second section 304 is illustrated along the jaw 310 of the animal, this disclosure contemplates positioning the second section along any portion of the fly mask 300 that would allow the fly mask 300 to stretch to accommodate movement of the jaw 310. Accordingly, the particular location of the second section 304 illustrated in FIG. 1 is only one example of such a location and others are considered herein.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A fly mask for an animal, consisting of:
a first section formed of a first material;

a second section formed of a second material that is at least partially elastic, the second section being fixedly coupled to the first section to permanently form a front orifice and a rear orifice; and a securing strap positioned on the first material proximate to the rear orifice and configured to selectively resize the rear orifice;

wherein the first and second section are fixedly coupled to one another to fit at least partially around the head of an animal and the elastic material deforms to allow the mask to accommodate many different configurations;

wherein the front orifice is sized to fit at least partially around the snout of the animal and the rear orifice is sized to fit around the head of the animal.

2. The fly mask of claim 1, wherein the second section is coupled to the first section to be positioned at least partially along the jaw of the animal to allow the jaw to selectively stretch the second material when the jaw moves.

3. The fly mask of claim 1, further comprising ear pockets defined in the first section wherein the ear pockets are sized to correspond with the ears of the animal.

4. The fly mask of claim 1, further comprising eye orifices defined in the first section and positioned to correspond with eyes of the animal.

5. The fly mask of claim 4, further comprising a third section formed of a third material that is at least partially transparent.

6. The fly mask of claim 5, further wherein the first material, second material, and third material are all different types of material.

7. The fly mask of claim 1, further wherein the first material and the second material are different types of material.

8. The fly mask of claim 1, further wherein the first material does not substantially elastically deform.

9. The fly mask of claim 1, further wherein the first material is a mesh material and is configured to cover the eyes of the animal and allow the animal to see there through.

10. The fly mask of claim 9, further wherein the first material defines ear orifices that are configured to allow ears of the animal to pass there through when the fly mask is positioned on the animal.

11. A method of manufacturing a fly mask, consisting of:
providing a first material and a second material that is different from the first material and that is at least partially elastic;
fixedly coupling the first material to the second material to permanently form a front orifice and a rear orifice of a fly mask that is configured to fit at least partially around the head of an animal; and
coupling a securing strap to the first material configured to selectively fit the fly mask to a head of an animal;
wherein, the second material is fixedly coupled to the first material at a location that allows the fly mask to elastically deform to accommodate many different size configurations;
wherein the front orifice is sized to fit at least partially around the snout of the animal and the rear orifice is sized to fit around the head of the animal.

12. The method of claim 11, further comprising forming the first material of a mesh material.

13. The method of claim 11, further comprising forming the second material at least partially of sport nylon spandex.

14. The method of claim 11, further comprising forming the second material at least partially of about 80% nylon and about 20% spandex.

15. The method of claim 11, further comprising forming the second material at least partially of tricot four-way stretch material.

16. The method of claim 11, further comprising fixedly coupling the first material to the second material so the second material is substantially aligned with a jaw of an animal when positioned thereon.

17. A fly mask for an animal, consisting of:
a first section formed of a first material;
a second section formed of a second material that is at least partially elastic and different from the first material; and
a securing strap positioned on the first material proximate to a rear orifice and configured to selectively resize the rear orifice;
wherein the first and second section are fixedly coupled to one another to fit at least partially around the head of an animal and the elastic material deforms to allow the mask to accommodate many different configurations;
wherein the first section is fixedly coupled to the second section to permanently form a front orifice and the rear orifice and the front orifice is sized to fit at least partially around the snout of the animal and the rear orifice is sized to fit around the head of the animal and the second section is fixedly coupled to the first section to be positioned at least partially along the jaw of the animal to allow the jaw to selectively stretch the second material when the jaw moves.

* * * * *